June 24, 1958 J. B. STEPHENSON 2,840,100
PIPE LINE TAPPING ASSEMBLY
Filed Aug. 24, 1953 2 Sheets-Sheet 1
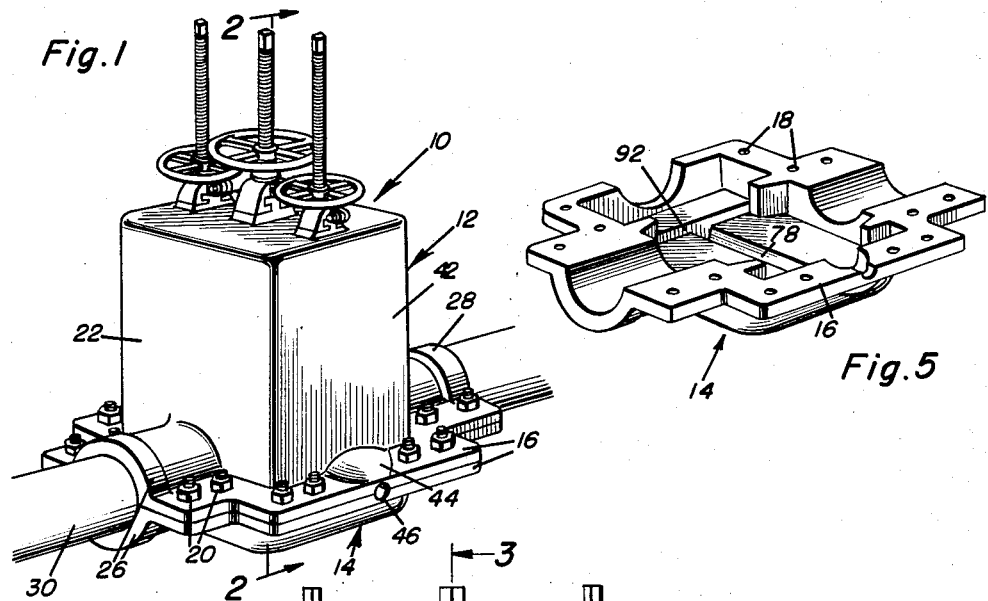
Joe B. Stephenson
INVENTOR.

June 24, 1958  J. B. STEPHENSON  2,840,100
PIPE LINE TAPPING ASSEMBLY
Filed Aug. 24, 1953  2 Sheets-Sheet 2

Joe B. Stephenson
INVENTOR.

United States Patent Office 2,840,100
Patented June 24, 1958

2,840,100

PIPE LINE TAPPING ASSEMBLY

Joe B. Stephenson, Edna, Tex., assignor of ten percent to William H. Hamblen and W. T. McNeil, both of Edna, Tex.

Application August 24, 1953, Serial No. 375,916

6 Claims. (Cl. 137—318)

This invention relates generally to valve assemblies and pertains more particularly to an improved valve assembly particularly adapted to be inserted into any type of pipe line without shutting off the flow in the line or lowering its pressure.

The present method of repairing a broken line involves the use of a duck nest, Mueller fittings and a rubber plug, requires six men, about 500 pounds of heavy equipment and from six to eight hours of labor. Utilizing a valve constructed in accordance with the present invention requires the services of no more than two men and will permit repair of the line in less than three hours.

Therefore, it is a primary object of this invention to provide an improved valve assembly which will save time and labor in the repairing of breaks in pipe lines and in tapping oil, gas or other lines.

Another object of this invention is to provide an improved valve that may serve as a permanent tap in the main line if desired.

Still another object of this invention is to provide an improved valve which may be utilized either to tap a main line for diverting gas to users, or it may be used to repair breaks, splits or blowouts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the valve assembly in place on a pipe line;

Figure 2 is a vertical section taken substantially along the plane of section line 2—2 in Figure 1 showing the manner of attaching the tapping machine in dotted lines;

Figure 5 is a perspective view of the lower section of the valve assembly.

Figure 3:
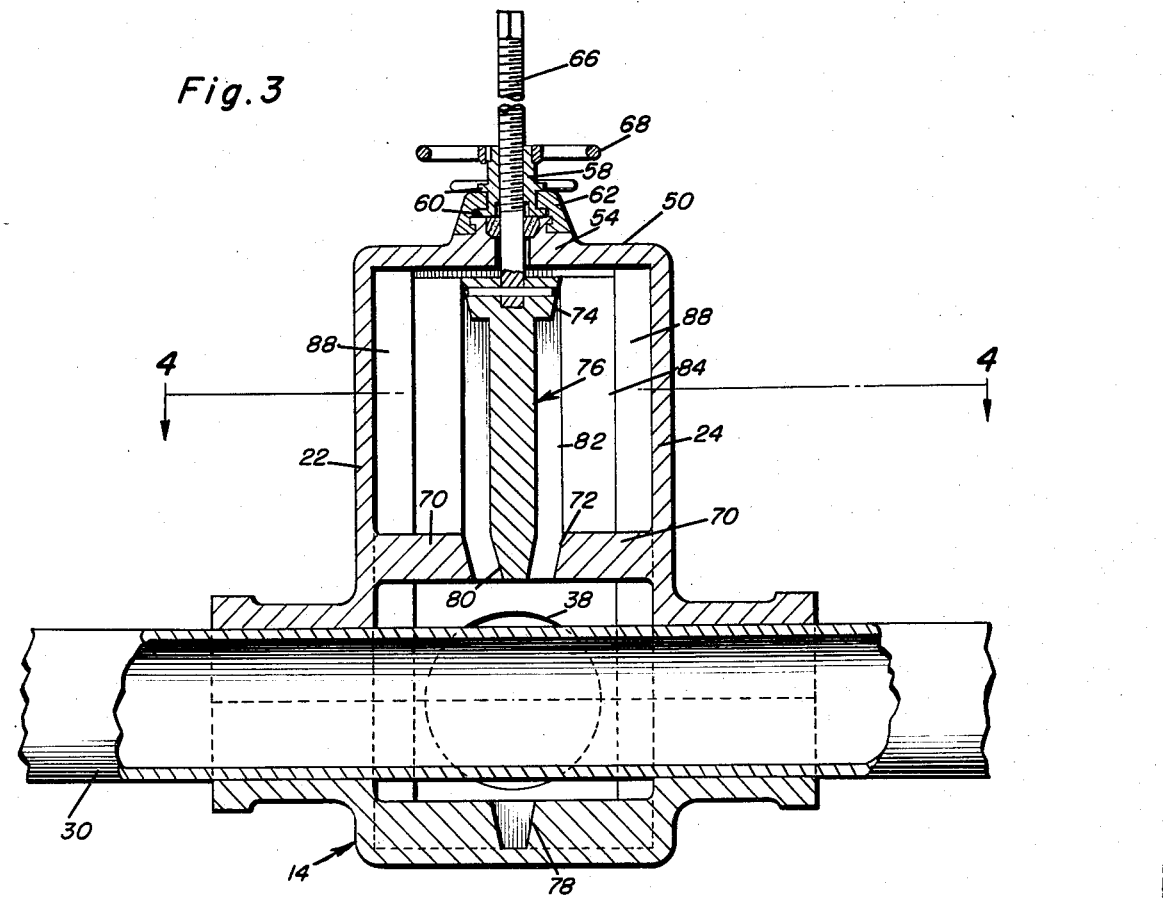
Figure 3 is another vertical section taken substantially along the plane of section line 3—3 in Figure 2 showing details of the internal construction of the valve assembly.

Referring now more particularly to the drawings, reference numeral 10 indicates generally the main body portion of the valve assembly which has a hollow interior and which is preferably of rectangular configuration in cross section. The housing or body member is split preferably along a horizontal plane to divide the housing into the upper and lower portions 12 and 14 respectively. Each section is provided with a marginal flange 16 which is provided with a series of apertures 18 for receiving the fastening members 20 which secure the body portions together. The side walls 22 and 24 of the upper section as well as corresponding opposite sides of the lower portion 14 are provided with semicircular bosses 26 and 28 which are provided with troughlike grooves so as to provide circular apertures or openings into the interior of the housing when the upper and lower sections are secured together, these openings being formed of such diameter as to receive a pipe line 30 in the manner shown. An intermediate side wall 32 of the housing is provided with the outwardly deformed portion 34 having the flange or shoulder portion 36 surrounding the opening 38 into the interior of the housing, this shoulder being provided with a series of circumferentially spaced threaded recesses 40, the purpose of which will be presently apparent.

The opposite side wall 42 is provided with a protuberance 44 having a central opening 46 on center with the opening 38 in the opposite side wall, this protuberance providing the socket 48 interiorly of the housing, the purpose of this construction being also presently apparent.

Figure 4:
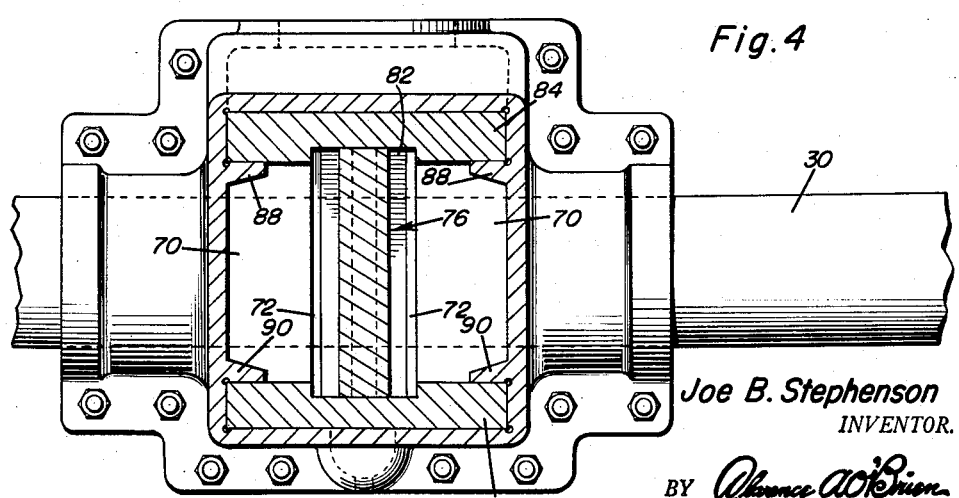
Figure 4 is a horizontal section taken substantially along the plane of section line 4—4 of Figure 3 showing still further details of the internal construction of the valve.

Referring now more particularly to Figures 2–4, it will be noted that the top wall 50 of the upper section is provided with a series of transversely spaced bosses 52, 54 and 56. Each of these bosses is provided with an elongated bushing member 58 having annular shoulders 60 for retaining the bushing rigidly within the bosses and one side of each of the bosses is provided with a removable cap member 62 provided with ears 64 for securement to corresponding ears of the bosses. Threaded valve stem members 66 project through and threadedly engage within the various bushings, the bushings being turnable through the medium of the hand wheel 68 for moving the valve stem in a vertical direction.

The interior of the upper section is provided with a pair of opposed horizontal shelf portions 70 whose inner edges are tapered as at 72 to seat against the tapered valve plate base 74 when the valve plate 76 is in its lowermost or closed position. A tapered groove 78 in the bottom section 14 is adapted to receive the tapered lower edge 80 of the valve plate 76 when the same is in closed position. The valve plate 76 is centrally disposed with respect to the housing and extends transversely thereof and is snugly received at its opposite sides with notches or grooves 82 in the longitudinal valve plate members 84 and 86 which are disposed at opposite sides of the housing and guided therein by virtue of the vertically extending ribs 88 and 90. The lower ends of these side plates 84 and 86 are received in the grooves 92 and 94 in the bottom of the lower member 14.

In operation of the valve device, the main body sections are placed over an existing pipe line 30 to surround the defective portion thereof or at a point where it is desired to tap into the pipe line and the fastening elements 20 securely fasten the valve assembly onto the pipe line. A tapping machine indicated in dotted lines in Figure 2 is bolted to the shoulder 36 of the valve assembly. This machine includes a protruding pilot bit and a concentric outer cutting collar or sleeve which is adapted to make a cut through the pipe line 30 to substantially the same diameter as the opening 38. The machine is fed into the interior of the valve housing and the pilot bit drills through the pipe line and guides the cutting sleeve to properly cut an intermediate portion of the pipe line. During the initial cutting operation, the aperture 46 on the opposite side wall 42 may be plugged in any suitable manner and when the cutting operation is completed the pilot bit protrudes through the aperture 46, while the section of pipe to be discarded and which has been cut out will be retained within the cutting sleeve. At this point, the tapping machine is reversed to remove the cutting assembly thereof from the interior of the valve housing and as soon as the pilot bit has cleared the valve plate 86, the same is manipulated through its associated handle 68 to the closed position which will prevent further leakage of the fluid within the pipe line 30 outwardly through the aperture 46. When the cutting assembly of the tapping machine is retracted its full extent, the valve plate 84 is lowered to the closed position and the tapping machine unbolted from the valve housing. If desired, a pipe section may be inserted and suitably secured within the aperture 38 whereafter the valve plate 84 may be raised to permit fluid to be diverted from the main pipe line 30 therethrough. The cut-away central portion of the pipe line will, of course, permit the central valve plate 76 to be lowered to its closed position and when all of the valve plates are thus closed, the valve assembly will function as a main gate valve for the pipe line.

It will be appreciated that it will be desirable to weld or otherwise suitably secure the pipe line 30 to the boss portion 26 of the valve housing and it will also be appreciated that the valve housing sections may be welded together when installed on the pipe line rather than provided with the flanges 16 for bolting together.

The only loss of fluid from the pipe line occurs for a very short period of time before the valve plate 86 is lowered to the closed position and it will be therefore readily appreciated that the fluid thus lost will be negligible and unnoticeable by consumers on the downstream side of the pipe line. Thus, the above described assembly permits full operation of the pipe line during its repair or the installation of an auxiliary line therefrom.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A valve device comprising a housing having upper and lower sections removably secured together, said upper and lower sections each having opposite end walls having cut-away portions for receiving a pipe line, said upper section including a top wall and side walls and shelves projecting inwardly of its end walls below said top wall, said shelves having spaced opposed edges, said lower section having a bottom wall and side walls, said lower section and said upper section side walls having cut-away portions cooperating to define apertures for the reception of a tool for cutting away a section of pipe within said housing, a first and a second valve plate slidably mounted in said housing for movement above and below said shelves, said valve plates being disposed in parallelism with the side walls of said housing, a third valve plate slidably disposed between and transversely of the first and second valve plates and including an enlarged upper head portion engageable with the opposed edges of said shelves, means connected with said valve plates to move the latter, whereby the first and second valve plates are movable to positions sealing off the apertures in said side walls and said third valve plate is movable to a position sealingly engaging said first and second valve plates and said shelves and the bottom wall of said lower section to block flow through the pipe line.

2. A valve device comprising a housing having upper and lower sections removably secured together, said upper and lower sections each having opposite end walls having cut-away portions for receiving a pipe line, said upper section including a top wall and side walls and shelves projecting inwardly of its end walls below said top wall, said shelves having spaced opposed edges, said lower section having a bottom wall and side walls, said lower section and said upper section side walls having cut-away portions cooperating to define apertures for the reception of a tool for cutting away a section of pipe within said housing, a first and a second valve plate slidably mounted in said housing for movement above and below said shelves, said valve plates being disposed in parallelism with the side walls of said housing, a third valve plate slidably disposed between and transversely of the first and second valve plates and including an enlarged upper head portion engageable with the opposed edges of said shelves, means operatively connected with said valve plates for moving said valve plates, whereby the first and second valve plates are movable to positions sealing off the apertures in said side walls and said third valve plate is movable to a position sealingly engaging said first and second valve plates and said shelves and the bottom wall of said lower section to block flow through the pipe line, said bottom wall being grooved to receive lower edge portions of said valve plates.

3. A valve device comprising a housing having upper and lower sections removably secured together, said upper and lower sections each having opposite end walls having cut-away portions for receiving a pipe line, said upper section including a top wall and side walls and shelves projecting inwardly of its end walls below said top wall, said shelves having spaced opposed edges, said lower section having a bottom wall and side walls, said lower section and said upper section side walls having cut-away portions cooperating to define apertures for the reception of a tool for cutting away a section of the pipe within said housing, a first and a second valve plate slidably mounted in said housing for movement above and below said shelves, said valve plates being disposed in parallelism with the side walls of said housing, a third valve plate slidably disposed between and transversely of the first and second valve plates and including an enlarged upper head portion engageable with the opposed edges of said shelves, whereby the first and second valve plates are movable to positions sealing off the apertures in said side walls and said third valve plate is movable to a position sealingly engaging said first and second valve plates and said shelves and the bottom wall of said lower section to block flow through the pipe line, and means including screws for selectively raising and lowering said valve plates.

4. The valve device of claim 1 wherein said housing has a pair of ribs projecting inwardly thereof behind which said first valve plate is slidable, and a second pair of ribs in said housing behind which said second valve plate is slidable in order to constrain the movement of said first and second valve plates.

5. The valve device of claim 1 wherein said housing has a pair of ribs projecting inwardly thereof behind which said first valve plate is slidable, and a second pair of ribs in said housing behind which said second valve plate is slidable in order to constrain the movement of said first and second valve plates, said first and second valve plates having confronting grooves in which said third valve plate is slidable to thereby guide the sliding movement of said third valve plate.

6. The valve device of claim 1 wherein said second valve plate has a longitudinal groove, said first valve plate has a longitudinal groove, said longitudinal grooves confronting each other, and said third valve plate being slidably disposed in said confronting grooves.

References Cited in the file of this patent

UNITED STATES PATENTS

| | | |
|---|---|---|
| 1,808,715 | Reynolds | June 2, 1931 |
| 1,898,935 | Brandriff | Feb. 21, 1933 |
| 1,989,768 | Nieman | Feb. 5, 1935 |